(12) United States Patent
Glendinning et al.

(10) Patent No.: US 8,346,305 B2
(45) Date of Patent: Jan. 1, 2013

(54) THEFT DETERRENT TECHNIQUES AND SECURE MOBILE PLATFORM SUBSCRIPTION FOR WIRELESSLY ENABLED MOBILE DEVICES

(75) Inventors: Duncan Glendinning, Chandler, AZ (US); Mojtaba Mirashrafi, Portland, OR (US); Saurabh Dadu, Tigard, OR (US); Mousumi M. Hazra, Beaverton, OR (US); Gyan Prakash, Beaverton, OR (US); Carol A. Bell, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 12/567,652

(22) Filed: Sep. 25, 2009

(65) Prior Publication Data

US 2011/0076986 A1    Mar. 31, 2011

(51) Int. Cl.
*H04M 1/00* (2006.01)
*H04B 1/38* (2006.01)

(52) U.S. Cl. ............... 455/558; 455/410; 455/412.2; 455/414.4; 455/418; 455/41.2; 455/566; 455/435; 726/34; 726/36; 340/568.1; 713/164

(58) Field of Classification Search .......... 455/558, 455/410, 411, 412.2, 414.4, 418–419, 41.2, 455/566, 435; 726/34–35, 36; 340/568.1; 713/164
See application file for complete search history.

(56) References Cited

U.S. PATENT DOCUMENTS

| | | | |
|---|---|---|---|
| 5,892,900 A | 4/1999 | Ginter et al. | |
| 6,169,891 B1 * | 1/2001 | Gorham et al. | 455/408 |
| 6,334,056 B1 * | 12/2001 | Holmes et al. | 455/445 |
| 6,484,262 B1 * | 11/2002 | Herzi | 726/34 |
| 6,976,163 B1 | 12/2005 | Hind et al. | |
| 7,174,564 B1 * | 2/2007 | Weatherspoon et al. | 726/2 |
| 7,188,089 B2 * | 3/2007 | Goldthwaite et al. | 705/67 |
| 7,440,572 B2 * | 10/2008 | Dellmo et al. | 380/270 |
| 7,493,393 B2 * | 2/2009 | Narayanan | 709/225 |
| 7,590,837 B2 * | 9/2009 | Bhansali et al. | 713/2 |
| 7,650,629 B2 * | 1/2010 | Halasz et al. | 726/2 |
| 7,661,001 B2 * | 2/2010 | Higurashi | 713/193 |
| 7,673,146 B2 * | 3/2010 | Wiedmann et al. | 713/182 |
| 7,756,507 B2 * | 7/2010 | Morper | 455/410 |
| 7,827,409 B2 * | 11/2010 | Fascenda | 713/171 |
| 7,835,724 B2 * | 11/2010 | McDonnell et al. | 455/411 |
| 7,854,009 B2 * | 12/2010 | Kim et al. | 726/26 |
| 7,865,938 B2 * | 1/2011 | Shahbazi | 726/4 |
| 7,903,817 B2 * | 3/2011 | Cam-Winget et al. | 380/270 |
| 7,950,045 B2 * | 5/2011 | Bogineni et al. | 726/3 |
| 7,965,842 B2 * | 6/2011 | Whelan et al. | 380/247 |
| 8,028,896 B2 * | 10/2011 | Carter et al. | 235/379 |
| 2005/0151623 A1 * | 7/2005 | von Hoffmann | 340/5.61 |
| 2005/0251868 A1 * | 11/2005 | James | 726/35 |
| 2009/0002162 A1 | 1/2009 | Glendinning | |
| 2009/0086980 A1 | 4/2009 | Glendinning | |
| 2010/0190474 A1 * | 7/2010 | Rajguru | 455/412.1 |

* cited by examiner

*Primary Examiner* — Marceau Milord
(74) *Attorney, Agent, or Firm* — Kacvinsky Daisak PLLC

(57) ABSTRACT

Theft deterrence and secure mobile platform subscription techniques for wireless mobile devices are described. An apparatus may comprise a removable secure execution module arranged to connect with a computing platform for a wireless mobile device. The removable secure execution module may comprise a first processing system to execute a security control module. The security control module may be operative to communicate with a security server over a wireless channel on a periodic basis to obtain a security status for the wireless mobile device. The security control module may output control directives to control operations for one or more components of the computing platform based on the security status. Other embodiments are described and claimed.

17 Claims, 4 Drawing Sheets

THEFT DETERRENT TECHNIQUES AND SECURE MOBILE PLATFORM SUBSCRIPTION FOR WIRELESSLY ENABLED MOBILE DEVICES

BACKGROUND

Wireless mobile devices are becoming increasingly distributed using a subscription model. Examples for a wireless mobile device may include a class of notebook or laptop computers referred to as a netbook. Netbooks are a rapidly evolving category of small, light and inexpensive laptop computers suited for general computing and accessing web-based services. A subscriber may enter into a subscription agreement with a wireless service provider to pay periodic charges for network services and in return receives a wireless mobile device. In some cases, however, a malicious subscriber may not return a wireless mobile device when terms of a subscription agreement expire or are violated, effectively stealing the wireless mobile device. Although a wireless service provider may cancel network service, a malicious subscriber may still use the stolen wireless mobile device as a computing device. Consequently, there is a substantial need for enhanced theft deterrent techniques to solve these and other problems.

DETAILED DESCRIPTION

Figure 1:
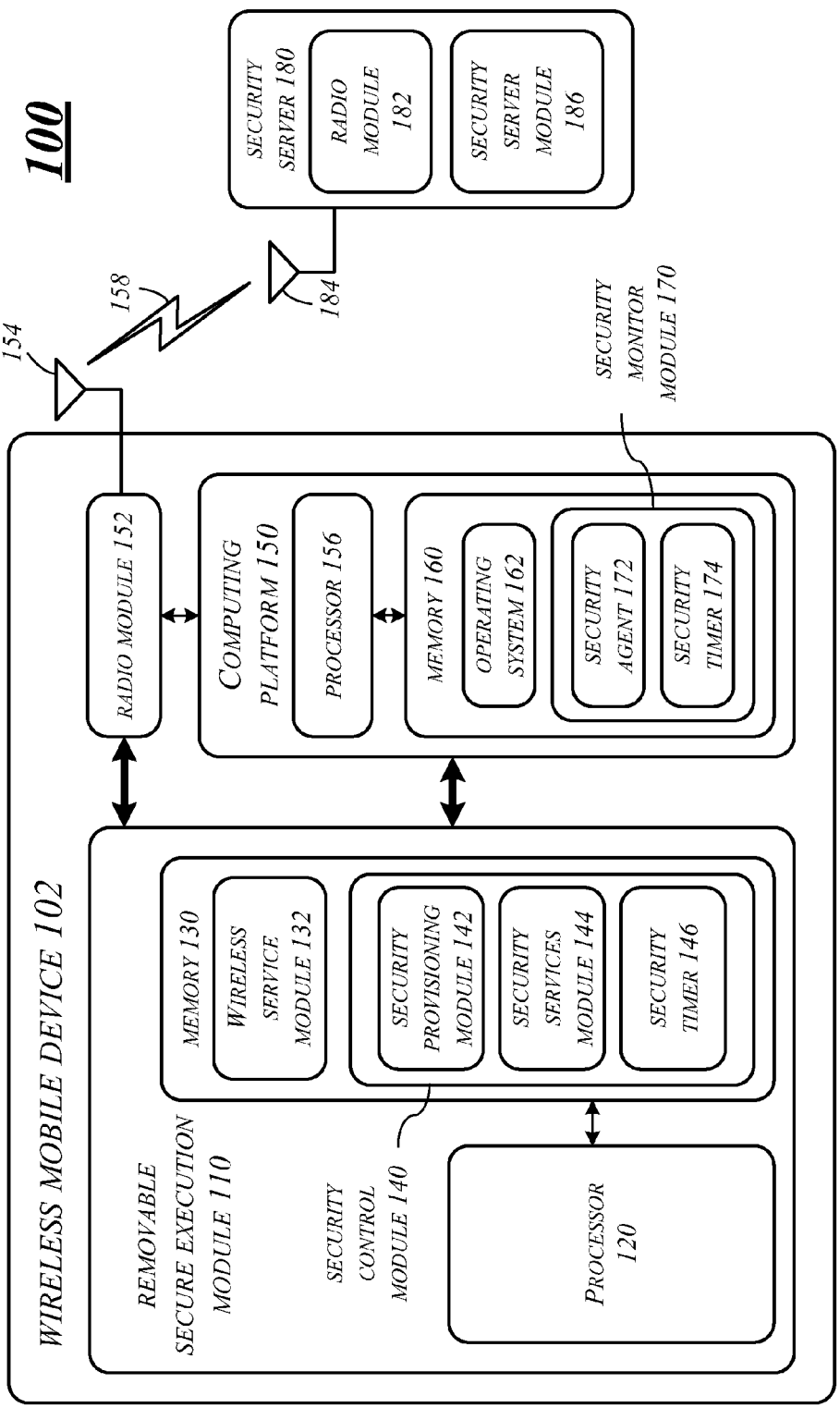
FIG. 1 illustrates one embodiment of a first network.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Embodiments are generally directed to enhanced theft deterrent techniques for wireless mobile devices having both communications and computing capabilities. Enhanced theft deterrent techniques are designed to improve security for a wireless mobile device by utilizing communications capabilities for the wireless mobile device to remotely disable certain components of the wireless mobile device, such as various components of a computing platform. This may be accomplished by implementing an enhanced theft deterrent system using modified versions of existing components and delivery systems for a wireless mobile device, thereby allowing seamless integration of the enhanced theft deterrent system with different networks and devices.

Many wireless mobile devices are designed to work with some form of external secure execution and storage device, such as a smart card. For instance, a wireless mobile device designed to operate with a cellular radiotelephone system for voice and/or data communications typically utilizes a form of smart card to store subscriber and device information. A particular type of smart card typically varies with a given device or cellular radiotelephone network. For example, a Global System for Mobile communications (GSM) device may utilize a subscriber identity module (SIM) card, a Universal Mobile Telecommunications System (UMTS) device may utilize a universal integrated circuit card (UICC), a Code Division Multiple Access (CDMA) device may utilize a removable user identify module (R-UIM) card, and so forth. It should be noted that in addition to utilizing a SIM attached to a modem as previously describe, the SIM card can also be attached directly to a platform independent of a modem. This may be accomplished, for example, using the International Organization for Standardization (ISO) 7816 family of standards to a Universal Serial Bus (USB) interface.

A smart card may control various computer and communications components of the wireless mobile device. For example, a SIM card for a GSM device securely stores an international mobile subscriber identity (IMSI) used to identify a subscriber of a wireless mobile device. A SIM card allows users to change phones by simply removing the SIM card from one wireless mobile device and inserting it into another wireless mobile device. A SIM card typically stores network specific information used to authenticate and identify subscribers on a given network, such as an integrated circuit card identifier (ICC-ID) for the SIM card, an IMSI for a subscriber, security authentication and ciphering information such as an Authentication Key (Ki), a Local Area Identity (LAI) and an Operator-Specific Emergency Number. A SIM card may also store other user or carrier specific data such as the Short Message Service Center (SMSC) number, a Service Provider Name (SPN), a Service Dialing Number (SDN), Advice-Of-Charge parameters, Value Added Service (VAS) applications, a list of subscribed services, user passwords such as a personal identification number (PIN), and other information.

Once a wireless mobile device has been activated to operate with a given cellular radiotelephone system, communications capabilities for the wireless mobile device may be controlled by a smart card. For example, communications capabilities for a wireless mobile device may be rendered inoperable when a smart card is removed from the device since the wireless mobile device will be unable to authenticate with a network. However, computing capabilities for a wireless mobile device may still be used even when the communications capabilities have been rendered inoperable. This may be problematic when a service provider leases a wireless mobile device based on payments for network services. When a subscriber fails to make payment, the service provider may cancel network services. This effectively disables communications capabilities for a wireless mobile device, but allows a user to still use the wireless mobile device as a computing device.

To solve these and other problems, embodiments may implement an enhanced theft deterrence system for a wireless mobile device to control a computing platform for the wireless mobile device utilizing a removable secure execution module, such as a smart card. A removable secure execution module may store building blocks for theft detection and platform disablement. In one embodiment, for example, an apparatus may comprise a removable secure execution module arranged to connect with a computing platform for a wireless mobile device. The removable secure execution module may comprise a processing system to execute a security control module. The security control module may be operative to communicate with a security server over a wireless channel on a periodic basis to obtain a security and subscription status for the wireless mobile device. The security control module may output control directives to control operations for one or more components of the computing platform based on the security and the subscription status. The smartcard will also maintain a system disable timer in secure storage referenced either to network time or system time to make sure computing device is connected or performs rendezvous operations with a server before the system disable timer expires. If the computing device does not rendezvous with a server before the system disable timer expires then system BIOS will block the device boot and request a user to enter either a service provider based unlock password or a temporary password (provisioned during activation of subscription service) to login to the system. In various embodiments, an enhanced theft deterrence system may utilize a distributed model where different components of the theft deterrence system are implemented in different devices. As such, operations for certain distributed enhanced theft deterrence system components may need to be coordinated. This coordination may involve the exchange of information. For instance, FIG. 1 shows that a wireless mobile device 102 and a security server 180 may exchange information, while the removable secure execution module 110 and wireless mobile device 102 may also exchange information. The exchange of information may be performed using messages implemented as signals allocated to various signal lines. In such allocations, each message is a signal. However, further embodiments may alternatively employ data messages. Such data messages may be sent across various connections or channels. Exemplary connections or channels include parallel interfaces, serial interfaces, bus interfaces, network interfaces, and so forth.

FIG. 1 illustrates a wireless network 100 suitable for implementing various theft deterrent techniques. The wireless network 100 may implement a variety of wireless communications technologies. These technologies may include cellular and data networking systems. In the illustrated embodiment shown in FIG. 1, the wireless network 100 may comprise a cellular radiotelephone network having at least a wireless mobile device 102 and a security server 180. It may be appreciated that other elements of a typical cellular and data networking system may also be implemented for the wireless network 100 and still fall within the scope of the embodiments.

The wireless mobile device 102 may comprise any electronic device having at least communications capabilities, computing capabilities, and mobility. Examples of an electronic device may include without limitation a user equipment (UE), a mobile device, a mobile station, a mobile unit, a personal digital assistant (PDA), a mobile computing device, a smart phone, a cellular telephone, a handset, a one-way pager, a two-way pager, a messaging device, a computer, a personal computer (PC), a desktop computer, a laptop computer, a notebook computer, a netbook computer, a handheld computer, a tablet computer, a thin client, consumer electronics, a gaming device, or any other suitable electronic device having communications capabilities, computing capabilities and mobility. Although the wireless mobile device 102 as shown in FIG. 1 has a limited number of elements in a certain topology, it may be appreciated that the wireless mobile device 102 may include more or less elements in alternate topologies as desired for a given implementation.

The wireless mobile device 102 may support cellular voice communication with a mobile network such as a Code Division Multiple Access (CDMA) network, Global System for Mobile Communications (GSM) network, North American Digital Cellular (NADC) network, Time Division Multiple Access (TDMA) network, Extended-TDMA (E-TDMA) network, Narrowband Advanced Mobile Phone Service (NAMPS) network, third generation (3G) network such as a Wide-band CDMA (WCDMA) network, CDMA-2000 network, Universal Mobile Telephone System (UMTS) network, and others.

The wireless mobile device 102 may support wireless wide area network (WWAN) data communication including Internet access. Examples of WWAN data communication services may include Evolution-Data Optimized or Evolution-Data only (EV-DO), Evolution For Data and Voice (EV-DV), CDMA/1×RTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others.

The wireless mobile device 102 may support wireless local area network (WLAN) data communication in accordance with the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and others.

The wireless mobile device 102 also may support data communication in accordance with shorter range wireless networks, such as a wireless personal area network (PAN) offering Bluetooth® data communication services in accordance with the Bluetooth® Special Interest Group (SIG) series of protocols, specifications, profiles, and so forth. Other examples of shorter range wireless networks may employ infrared (IR) techniques or near-field communication techniques and protocols, such as electro-magnetic induction (EMI) techniques including passive or active radio-frequency identification (RFID) protocols and devices.

As shown in FIG. 1, the wireless mobile device 102 may comprise, by way of example, a removable secure execution module 110, a computing platform 150, and one or more radio modules 152. Although some embodiments may be illustrated and described as comprising exemplary functional components and/or modules performing various operations, it can be appreciated that such components or modules may be implemented in hardware, software, firmware, or in any combination thereof. In addition, while a limited number of functional components and/or modules may be shown for purposes of illustration, it can be appreciated that the wireless mobile device 102 may include other elements in accordance with the described embodiments.

The radio module 152 may comprise various radio elements, including a radio processor, one or more transceivers, amplifiers, filters, switches, and so forth. The radio module 152 may be arranged to provide voice and/or data communication functionality for the wireless mobile device 102 for operating in accordance with different types of wireless network systems. It may be appreciated that the radio module 152 may utilize different radio elements to implement different communication techniques.

The radio module 152 may be connected to an antenna or antenna system 154. The antenna system 154 may comprise or be implemented as one or more internal antennas and/or external antennas for transmitting and receiving electrical signals. In some embodiments, the antenna system 154 may support operation of the wireless mobile device 102 in multiple frequency bands or sub-bands such as the 2.4 GHz range of the ISM frequency band for WiFi and Bluetooth® communications, one or more of the 850 MHz, 900 MHZ, 1800 MHz, and 1900 MHz frequency bands for GSM, CDMA, TDMA, NAMPS, cellular, and/or PCS communications, the 2100 MHz frequency band for CDMA2000/EV-DO and/or WCDMA/UMTS communications, the 1575 MHz frequency band for Global Positioning System (GPS) operations, and others.

The removable secure execution module 110 may comprise any removable device providing a secure execution environment suitable for storing data and executing various applications, including a theft deterrent system for the wireless mobile device 102. In various embodiments, the removable secure execution module 110 supports cryptographic operations and has volatile and/or non-volatile memory to securely store cryptographic keys and identification data needed to authenticate the wireless mobile device 102 with a network. In various embodiments, the removable secure execution module 110 may be implemented as a smart card or some variation thereof. When used with a cellular radiotelephone system, for example, the removable secure execution module 110 may be implemented as a smart card such as a SIM card, a UICC, a (R-UID) card, and other suitable removable media. When used with a GSM cellular radiotelephone system, for example, the removable secure execution module 110 may be implemented as a SIM card having an IMSI for an operator of the wireless mobile device 102 and an ICC-ID for the SIM card. In one embodiment, for example, the removable secure execution module 110 may be implemented as a Universal Serial Bus (USB) smart card device, such as a USB Smart Card Token, in conjunction with one or more international standards including without limitation the International Organization for Standardization (ISO)/International Electrotechnical Commission (IEC) 7816 family of standards, the ISO/IEC 14443 family of standards, and so forth. The embodiments are not limited, however, to a particular smart card implementation for the removable secure execution module 110.

The removable secure execution module 110 may store various components for a theft deterrent system, including theft detection and platform disablement components, which may be used to configure the wireless mobile device 102 with theft deterrent services. The removable secure execution module 110 may install certain theft deterrent components (e.g., software modules, timers and policies) on the wireless mobile device 102 and automatically enroll the wireless mobile device 102 in theft deterrent services provided by the security server 180. The theft deterrent components may be arranged to disable portions of the wireless mobile device 102 when one or more security timers expire or unauthorized subscription service is tampered or in response to control directives from the security server 180. The theft deterrent components may take advantage of network services and connectivity to implement a "rendezvous" service that periodically sends signals to the security server 180 to reset one or more security timers, and disable access to data or shutdown portions of the wireless mobile device 102 when the security timers expire. If the wireless computing device 102 is reported stolen, the security server 180 may send a control directive to the theft deterrent components to trigger policy based action of setting the wireless mobile device 102 in a "stolen state or disable state," and disabling or shutting down the device accordingly. To re-enable the wireless mobile device 102 when in a stolen state, a user may enter recovery credentials to the wireless mobile device 102 or a network service provider via the security server 180, and once the recovery credentials are verified, access may be re-enabled to the wireless mobile device 102.

In various embodiments, the removable secure execution module 110 and logic for one or more theft deterrent system components may be implemented using a processor, microprocessor, controller, microcontroller, embedded controller, application specific integrated circuit (ASIC), an analog circuit, a digital circuit, a programmed logic device, a memory device containing instructions, and so forth. The embodiments are not limited in this context.

In one embodiment, the removable secure execution module 110 may provide various theft deterrent system components using various Java Card technologies. The term "Java Card" refers to a technology that allows small Java-based applications (applets) to be run securely on smart cards and similar small memory footprint devices. Java Card technologies provide Java-based applications for embedded devices. Java Card gives the user ability to program the device and make them application specific. It is widely used in SIM cards, such as GSM mobile phones and ATM cards. Some Java Card products are based on the Java Card Platform specifications developed by Sun Microsystems. Many Java card products also rely on the GlobalPlatform specifications for the secure management of applications on the card (e.g., download, installation, personalization, deletion). It may be appreciated that other programming languages and operating systems may be used for the removable secure execution module 110, and the embodiments are not limited in this context.

In one embodiment, the removable secure execution module 110 can utilize a secure microcontroller, which may include cryptographic apparatus, configured with to perform selected cryptographic engine functions, such as encryption, decryption, random number generation, and secure communications. Additionally or alternatively, the removable secure execution module 110 may also include a processing apparatus configured to perform routine processing functions, including platform boot and the aforementioned one or more administrative services. Such cryptographic engine functions may be configured to support public key infrastructure (PKI)-types of cryptographic operations.

Utilizing the removable secure execution module 110 as a delivery mechanism and channel for theft deterrent or secure mobile platform subscription services provides several advantages relative to conventional solutions. For example, various theft deterrent components may be implemented for the wireless mobile device 102 even when the wireless mobile device 102 is a legacy device that has no software and/or hardware for theft deterrent services pre-loaded on the wireless mobile device 102 (e.g., during manufacture or prior to delivery to a user). In another example, a theft deterrent system may not be easily defeated by re-installing or modifying an operating system for the wireless mobile device 102, such as an operating system 162. In yet another example, a theft deterrent system may not be easily broken by switching out a hard drive or other memory unit for the wireless mobile device 102. In still another example, a theft deterrent system utilizes existing components for the wireless mobile device 102 and a corresponding network service provider, thereby facilitating deployment of theft deterrent services. In yet another example, a theft deterrent system is bound to hardware components for the wireless mobile device 102, thereby making the theft deterrent system harder to defeat. In still another example, a network provider may deploy a theft deterrent system automatically without user intervention beyond inserting the removable secure execution module 110 into the wireless mobile device 102. These and other advantages provide enhanced theft deterrent services for the wireless mobile device 102 and a corresponding network service provider for the wireless mobile device 102.

As shown in FIG. 1, the removable secure execution module 110 may comprise a processing system including a processor 120 and a memory 130. The memory 130 may store a wireless service module 132 and a security control module 140. The security control module 140 may include a security provisioning module 142, a security services module 144 and a security timer 146.

The processor 120 may comprise a general purpose processor or an application specific processor arranged to provide general or specific computing capabilities for the wireless mobile device 102. In various embodiments, the processor 120 may comprise a single or multi-core processor. Examples for processor 120 may include without limitation a central processing unit (CPU), multi-processing unit, a reduced instruction set computer (RISC), a processor that have a pipeline, a complex instruction set computer (CISC), digital signal processor (DSP), a controller, a micro-controller, embedded controller, integrated controller, and so forth. In one embodiment, for example, the processor 120 may be implemented as a secure processor configured to perform selected cryptographic engine functions. It may be appreciated that the wireless mobile device 102 may use any suitable number of processors in accordance with the described embodiments.

The memory 130 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information. In one embodiment, for example, the memory 130 may be implemented using a secure non-volatile flash memory. The embodiments, however, are not limited in this context.

The computing platform 150 may provide various computing capabilities for the wireless mobile device 102. As with the removable secure execution module 110, the computing platform may implement a processing system including a processor 156 and a memory 160. The computing platform 150 may also include other platform components for the wireless mobile device 102, such as various input/output (I/O) devices (e.g., a digital display, keyboard, thumbboard, pointing device, vibrator, LED, digital camera, etc.), power supplies, controllers, interfaces, buses, cooling systems, fans, and so forth. The embodiments are not limited in this context.

The processor 156 may be similar in structure, operations and examples as those given for the processor 120 of the removable secure execution module 110. Additionally or alternatively, the computing platform 150 may implement either a single or dual processor architecture. In a single processor architecture, the processor 156 may provide computing capabilities for both the computing platform 150 and the radio module 152. In a dual processor architecture, the computing platform 150 may implement the processor 156 and the radio module 152 may implement a separate processor (not shown) that communicate with each other using interfaces such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth. The embodiments are not limited in this context.

The memory 160 may similar in structure, operations and examples as those given for the memory 130 of the removable secure execution module 110. The memory 130 for the computing platform 150 may store an operating system 162 and a security monitor module 170. The security monitor module 170 may include a security agent 172 and a security timer 174. The memory 130 may store other software, including system programs, application programs, and supporting data.

In general operation, the wireless mobile device 102 may communicate with one or more network elements, including the security server 180. The security server 180 may comprise a radio module 182 and antenna 184 compatible with the radio module 152 and antenna 152 of the wireless mobile device 102. As such the wireless mobile device 102 and the security server 180 may communicate information over a wireless channel 158 utilizing one or more radio-frequency (RF) bands allocated to the radio modules 152, 182.

The security server 180 may be implemented as part of infrastructure equipment provided by a given network service provider, such as a GSM cellular radiotelephone network, for example. The security server 180 may include a security server module 186 to provide security services for the wireless mobile device 102. For instance, the security server module 186 may interoperate with the security control module 140 and the security monitor module 170 to implement an enhanced theft deterrent system for the wireless mobile device 102. When the wireless mobile device 102 is considered stolen or unauthorized for use with a given subscriber, the security server module 186 may coordinate with the security control module 140 and the security monitor module 170 to disable one or more components of the computing platform 150.

In one embodiment, the removable secure execution module 110 may comprise a smart card, such as a SIM card, that can be connected and disconnected from the wireless mobile device 102 using a corresponding interface provided by the wireless mobile device 102. When connected to the wireless mobile device 102, the removable secure execution module 110 may establish a connection to the computing platform 150 indirectly via an interface exposed by the radio module 152 and/or directly via interfaces such as one or more USB interfaces, micro-USB interfaces, UART interfaces, GPIO interfaces, control/status lines, control/data lines, and so forth.

When connected to the computing platform 150, the removable secure execution module 110 may utilize the processor 120 to securely execute the security control module 140 stored by the memory 130. When executed, the security control module 140 may be generally operative to communicate with the security server 180 over the wireless channel 158. In one embodiment, the security control module 140 and the security server 180 may communicate on a periodic, aperiodic or on-demand basis to obtain a security status for the wireless mobile device 102. The security control module 140 may then generate and output one or more control directives to control operations (e.g., enable or disable) for one or more components of the computing platform 150 based on the security status indicated by the security server 180.

The security control module 140 may include the security provisioning module 142. When the removable secure execution module 110 is connected to the wireless mobile device 102 for the first time, the security provisioning module 142 may be arranged to automatically provision the computing platform 150 with the security monitor module 170. The provisioning feature allows the removable secure execution module 110 to deploy theft deterrent system components for any existing wireless mobile device used with a given cellular or data network deploying the security server 180. The security monitor module 170 may be stored in memory 160 of the computing platform 150, and executed by the processor 156. Additionally or alternatively, the security monitor module 170 may be executed by other processors available from the wireless mobile device 102, such as a radio processor for the radio module 152, a media access control (MAC) controller, a local area network (LAN) controller, and other processors.

Once provisioned, the security provision module 142 binds the removable secure execution module 110 to the computing platform 102 and the security monitor module 170 provisioned on the computing platform 102. This ensures that the removable secure execution module 110 can only be used with the wireless mobile device 102, and vice-versa. It may be appreciated, however, that the removable secure execution module 110 may be arranged for use with multiple wireless mobile devices as well. For instance, a single user may have both a netbook and a notebook, and a single removable secure execution module 110 may be used for both devices to provide theft deterrent services.

The security control module 140 may include the security services module 144 and the security timer 146. The security services module 144 may be generally arranged to operate as an intermediary or relay service between the security server module 186 of the security server 180 and the security monitor module 170. The security timer 146 is used to measure whether the security server module 186 sends a particular signal or message within a defined time interval.

The security monitor module 170 may form a secure connection with the security control module 140. The secure connection may be established using a defined public-key cryptography technique, with each having a PKI-based key pair to provide authentication and cryptographic services.

The security monitor module 170 may use the secure connection with the security control module 140 to securely communicate information needed to provide theft deterrent services for the wireless mobile device 102. For instance, the security monitor module 170 may receive control directives from the security control module 140 over the secure connection, and control operations for one or more components of the computing platform 150 based on the control directives.

The security monitor module 170 is an entity that monitors whether the security services module 144 executing on the removable secure execution module 110 is active or not. If the security services module 144 is not active, the security monitor module may shut down or disable some or all of the electronic components for the wireless mobile device 102. In one embodiment, for example, the security monitor module 170 may include a security agent 172 and a security timer 174. The security agent 172 may be generally arranged to monitor for signals from the security services module 144 on behalf of the computing platform 150. The security timer 174 is used to measure whether the security services module 144 sends a signal or message within a defined time interval.

The security services module 144 may implement a rendezvous technique with the security server 180. In one embodiment, for example, the security services module 144 sends periodic signals or messages to the security server module 186 to determine a security status for the wireless mobile device 102. The security services module 144 also sends periodic signals or messages to the security agent 172 of the security monitoring module 170. Both the security services module 144 and the security agent 172 examine respective security timers 146, 174 to determine whether to disable components of the computing platform 150.

If the security services module 144 fails to receive a response from the security server module 186 within a defined time interval as measured by the security timer 146, the security services module 144 may assume the wireless mobile device 102 is no longer authorized for use by an operator and notifies the security monitor module 170 to disable one or more components of the computing platform 150. The notification can be explicit using a disable signal or message. The notification can also be implicit by failing to send a security timer reset signal to the security agent 172 before expiration of a defined time interval measured by the security timer 174. In either case, the security agent 172 receives the notification and disables certain components of the computing platform 150 as indicated by a given security policy.

Figure 2:
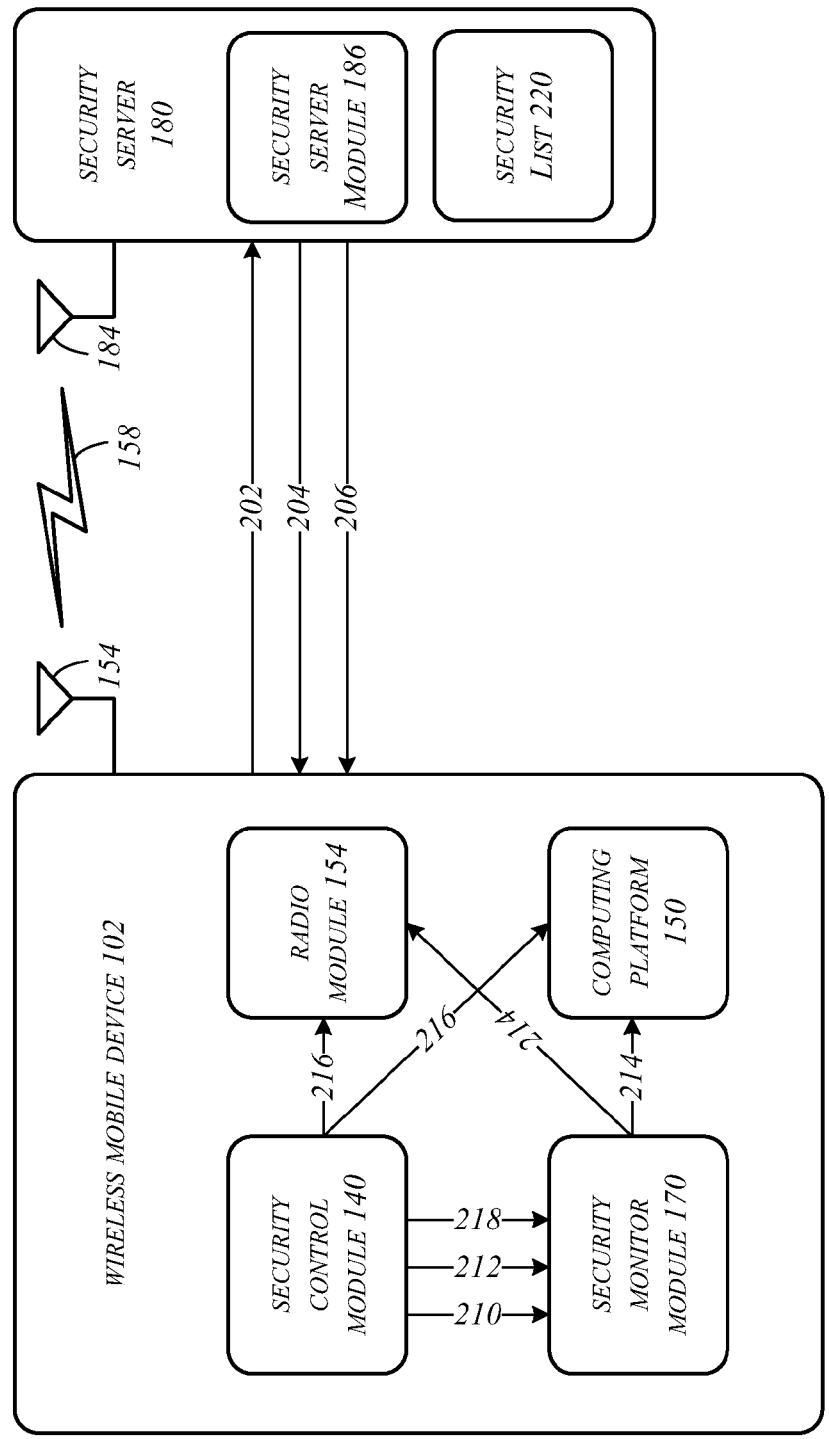
FIG. 2 illustrates one embodiment of a second network.

FIG. 2 illustrates a wireless network 200. The wireless network 200 may be similar to the wireless network 100 with the addition of various message flows between the various elements of the wireless network 100 over the wireless channel 158.

In the illustrated embodiment shown in FIG. 2, the security services module 144 of the security control module 140 may be arranged to send a security timer update signal 202 to the security server module 186 of the security server 180. The security server module 186 may check a security list 220 to retrieve a security status for the wireless mobile device 102. If the security status indicates authorized use, then the security server module 186 may send a first security timer reset signal 204 to the wireless mobile device 102.

If the security status indicated unauthorized use, however, the security server module 186 may indicate this security status in multiple ways. In one embodiment, for example, the security server module 186 may send a first disable signal 206 to the wireless mobile device 102. When the security status indicates unauthorized use, the security server module 186 and the security services module 144 may implement various remote device management techniques to remotely manage components for the wireless mobile device 102. In one embodiment, for example, the security server module 186 and the security services module 144 may implement a device management protocol as specified by the Open Mobile Alliance (OMA) Device Management (DM) Working Group and the Data Synchronization (DS) Working Group OMA DM specification version 1.2, April 2006, ("OMA DM Specification") and its progeny, revisions and variants. In one embodiment, the first disable signal 206 may be generated in according with the OMA DM Specification to explicitly manage components for the wireless mobile device 102. When the security services module 144 receives the first disable signal 206 from the security server module 186, the security services module 144 may send the second disable signal 212 to the security agent 172 for the security monitor module 170 to disable operations for one or more components of the computing platform 150. Additionally or alternatively, the security server module 186 may not send any explicit signal to the security services module 144, and simply let the first security timer 146 to expire, thereby triggering the security services module 144 to notify the security agent 142 to disable one or more components of the computing platform 150.

Once the security services module 144 sends the security timer update signal 202 to the security server module 186 of the security server 180, the security services module 144 may determine whether the first security timer reset signal 204 is received from the security server 180 before the first security timer 146 expires.

When the first security timer reset signal 204 is received before the first security timer 146 expires, the security services module 144 resets the first security timer 146, and sends a second security timer reset signal 210 to the security agent 172 for the security monitor module 170 to reset the second security timer 174 for the security monitor module 170. The security agent 172 of the security monitor module 170 may receive the second security timer reset signal 210 and reset the second security timer 174, thereby avoiding disabling operations by the security agent 172.

When the first security timer reset signal 204 is not received before the first security timer 146 expires, however, the security services module 144 does not reset the first security timer 146, and instead sends a second disable signal 212 to the security agent 172 for the security monitor module 170 to disable operations for one or more components of the computing platform 150. Additionally or alternatively, the security services module 144 may not send any signal to the security agent 172, and simply let the second security timer 174 to expire, thereby triggering the security agent 172 to disable one or more components of the computing platform 150.

The security monitor module 170 may disable various components of the computing platform 150 and/or other components of the wireless mobile device 102 (e.g., radio module 154) under several different types of conditions. For example, the security agent 172 of the security monitor module 170 may disable components of the computing platform 150 when the second security timer 174 expires, when the security agent 172 detects the removable secure execution module 110 is disconnected from the computing platform 150, or when the security agent 172 receives the second disable signal 212 from the security services module 144 of the security control module 140. Examples for disabling components of the computing platform 150 may include without limitation accelerating the security timer 174 to an expiration time, disrupting power to a component, disabling certain component drivers, locking a component, disrupting power to a user interface, disrupting communications between components, masking a component, and so forth.

In various embodiments, examination of various security timers, such as the security timers 146, 174, may be used to disable components of the computing platform 150. Expiration of the security timers 146, 174 may trigger the disabling operations unless refreshed prior to expiration. The security timer 146 used by the security services module 144 may be refreshed based on the first security timer reset signal 204 received from the security server module 186. The security timer 174 used by the security agent 172 may be refreshed based on the second security timer reset signal 210 received from the security services module 144.

A particular time interval for each of security timers 146, 174 may vary for a given implementation, and may be set for respective M, N time periods, where M and N represent positive integers. The time periods may be measured in seconds, minutes, hours, days, weeks, months, years or any other granularity as desired for a given implementation. Although in some implementations the time periods M, N may be equal, in typical implementations the time period M is larger than time period N due to latency and bandwidth constraints for the wireless channel 158. In addition to time periods, the security timers 146, 174 may be configured to measure events, such as a number of executed instructions by the processors 120, 156, a number of uses of the wireless mobile device 102, a number of uses of an application program of the wireless mobile device 102, and other measurable events. The embodiments are not limited in this context.

In one embodiment, the security agent 172 of the security monitor module 170 may disable components of the computing platform 150 or the radio module 154 when the second security timer 174 expires. The security agent 172 may be arranged to monitor the second security timer 174. The security services module 144 may periodically send the second security timer reset signal 210 to reset the second security timer 174. When the security services module 144 does not send the second security timer reset signal 210 before expiration of the second security timer 174, the security agent 172 is notified of the expiration and sends platform component disable signal 214 to the computing platform 150 and/or the radio module 154. The specific components to be disabled for the wireless mobile device 102 may be defined in a security policy stored by the wireless mobile device 102. In this manner, the components to be disabled may be dynamically updated by updating the security policy. The security policy may be remotely updated, for example, by the security server module 186 via the wireless channel 158.

In one embodiment, the security agent 172 of the security monitor module 170 may disable components of the computing platform 150 or the radio module 154 when the security agent 172 detects the removable secure execution module 110 is disconnected from the computing platform 150. This reduces the possibility of system tampering by spoofing the functions or operations of the removable secure execution module 110.

In one embodiment, the security agent 172 of the security monitor module 170 may disable components of the computing platform 150 or the radio module 154 when the security agent 172 receives the second disable signal 212 from the security services module 144 of the security control module 140. This potentially reduces the amount of time needed to disable operations for the target components relative to waiting for the security timer 174 to expire.

Additionally or alternatively, the security control module 140 may bypass the security monitor module 170 and disable components of the computing platform 150 or the radio module 154 directly using a platform component disable signal 216. This may be advantageous when the security monitor module 170 itself becomes corrupted, compromised or disabled.

The security control module 140 and the security monitor module 170 may also be used to recover disabled components of the wireless mobile device 102. In one embodiment, for example, the security services module 144 may send the security timer update signal 202 to the security server 180, determine whether the first security timer reset signal 204 is received from the security server 180 before the first security timer 146 expires, and send an enable signal 218 to the security agent 172 for the security monitor module 170 to enable previously disabled operations for one or more components of the computing platform 150 (or other components of the wireless mobile device 102) when the first security timer reset signal 204 is received before the first security timer 146 expires. The security control module 140 and/or the security monitor module 170 may also cause the operating system 162 to display messages on a user interface to allow a user to enter parameters or to view the status of the security control module 140 and/or the security monitor module 170. If the wireless mobile device 102 is disabled, the client interface may allow a user to receive messages, codes or recovery credentials for re-enabling the wireless mobile device 102.

The removable secure execution module 110 and managed theft deterrent system components (e.g., security control module 140 and security monitor module 170) may be remotely managed from the security server 180. The program components, policies, security timers, state variables, registers and other theft deterrent system components may be modified using different communications protocols and communications techniques. In various embodiments, the theft deterrent system components may be modified using different communications protocols comprising part of the Internet Protocol Suite, including the Transmission Control Protocol (TCP), the Internet Protocol (IP), Real-Time Transport Protocol (RTP), and other transport mechanisms. In various embodiments, the theft deterrent system components may also be modified using mobile messaging techniques such as instant message (IM), short message service (SMS), multimedia message service (MMS), email services, chat message, text message and so forth. The use of mobile messaging techniques, such as SMS, may be used to manage the various theft deterrent system components in a manner similar to conventional techniques for modifying state variables for a SIM card. In this manner the theft deterrent system components may be dynamically updated with revisions and upgrades in a seamless and integrated solution.

As an added measure of security, the security provisioning module 142 may modify a system BIOS for the computing platform 150 to query the removable secure execution module 110 for a security state every time the wireless mobile device 102 is powered on and before starting the operating system 162 for the computing platform 150. If the security state is unauthorized, then the system BIOS will not start the operating system 162 and shut-down the wireless mobile device 102. If the security state is authorized, then the system BIOS will start operating system 162 and complete normal start-up operations for the wireless mobile device 102.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 3:
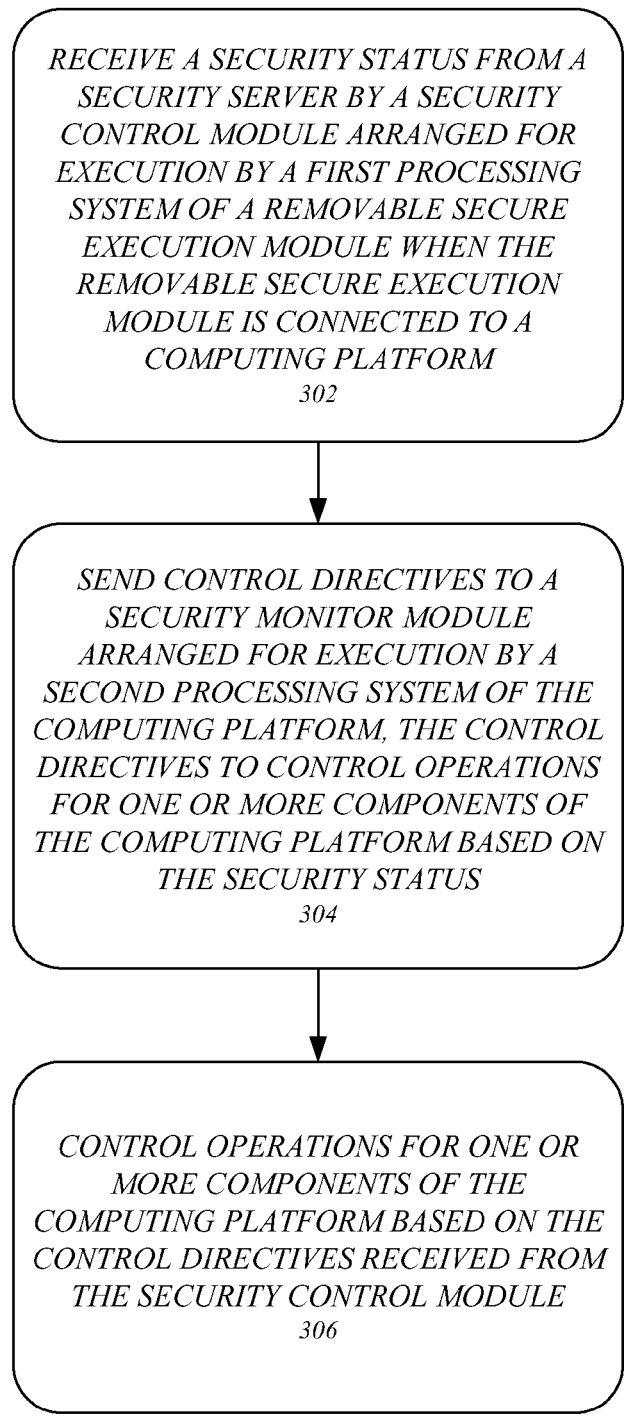
FIG. 3 illustrates one embodiment of a logic diagram.

FIG. 3 illustrates one embodiment of a logic flow 300. The logic flow 300 may be representative of some or all of the operations executed by one or more embodiments described herein.

In the illustrated embodiment shown in FIG. 3, the logic flow 300 may receive a security status from a security server by a security control module arranged for execution by a first processing system of a removable secure execution module when the removable secure execution module is connected to a computing platform at block 302. For example, the security services module 144 of the security control module 140 may receive a security status from the security server 180. The security control module may be executed by a first processing system (e.g., processor 120 and memory 130) of the removable secure execution module 110 when the removable secure execution module 110 is connected to the computing platform 150.

The logic flow 300 may send control directives to a security monitor module arranged for execution by a second processing system of the computing platform, the control directives to control operations for one or more components of the computing platform based on the security status at block 304. For example, the security services module 144 of the security control module 140 may send control directives to the security monitor module 170. The security monitor module 170 may be executed by a second processing system (e.g. processor 156 and memory 160) of the computing platform 150. The security services module 144 may generate the control directives to control operations for one or more components of the computing platform 150 based on the security status received from the security server 180.

The logic flow 300 may control operations for one or more components of the computing platform based on the control directives received from the security control module at block 306. For example, the security agent 172 of the security monitor module 170 may receive the control directives received from the security services module 144 of the security control module 140, and control operations for one or more components of the computing platform 150 based on the control directives. Additionally or alternatively, the control directives may be inferred by the security agent 172 when no control directives are explicitly received prior to expiration of the security timer 174.

Figure 4:
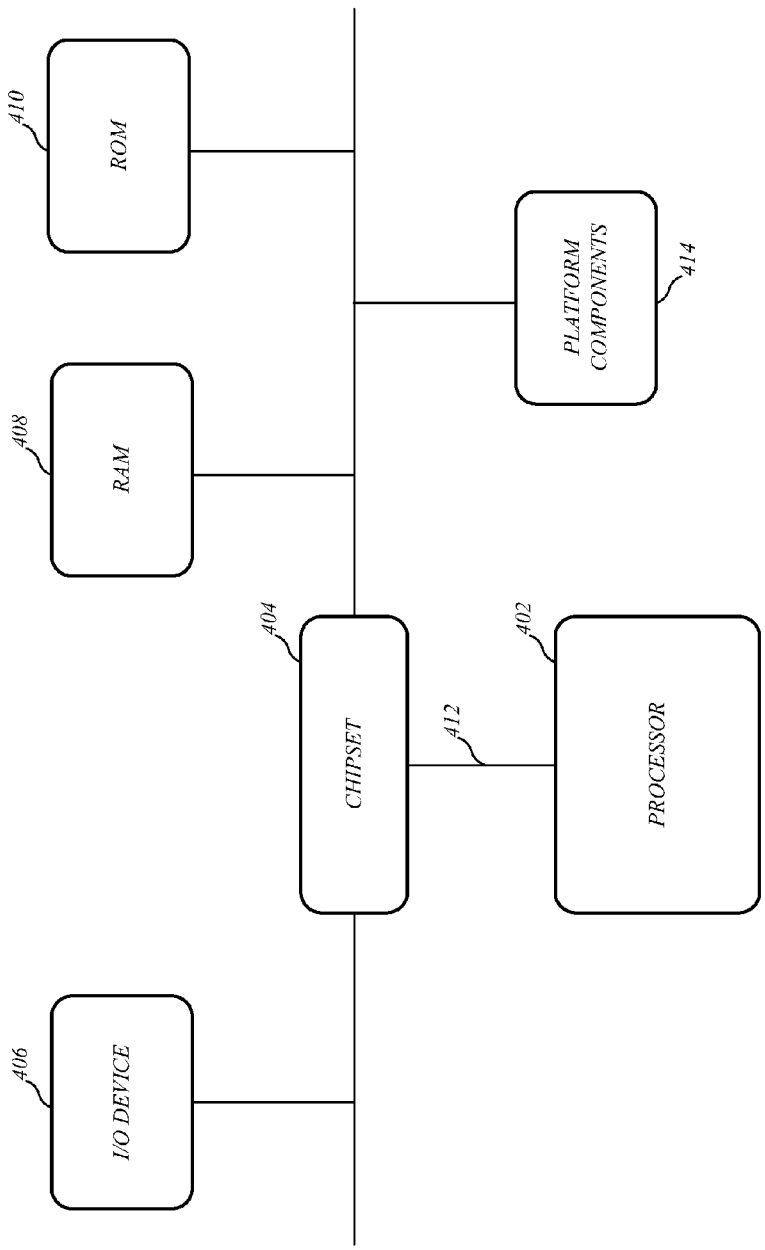
FIG. 4 illustrates one embodiment of a system.

FIG. 4 is a diagram of an exemplary system embodiment suitable for use with various embodiments described above, such as the wireless mobile device 102, the removable secure execution module 110, or the security server 180. In particular, FIG. 4 is a diagram showing a system 400, which may include various elements. For instance, FIG. 4 shows that system 400 may include a processor 402, a chipset 404, an input/output (I/O) device 406, a random access memory (RAM) (such as dynamic RAM (DRAM)) 408, and a read only memory (ROM) 410, and various platform components 414. The platform components 414 may include any electronic components for a wireless mobile device, such as the wireless mobile device 102, including without limitation various components for a computing platform 150, a communications platform including the radio module 152, or a combination of both. Examples of components for the computing platform 150 include without limitation the processor 156, the memory 160, software stored by the memory 160, one or more input/output (I/O) devices (e.g., a digital display, keyboard, thumbboard, pointing device, vibrator, LED, digital camera, etc.), power supplies, controllers, interfaces, cooling systems, fans, a digital thermal management (DTM) system, and so forth. Examples for components for a communications platform include without limitation the radio module 152, the antenna 154, power supplies, controllers, interfaces, and so forth. These elements may be implemented in hardware, software, firmware, or any combination thereof. The embodiments, however, are not limited to these elements.

As shown in FIG. 4, I/O device 406, RAM 408, and ROM 410 are coupled to processor 402 by way of chipset 404. Chipset 404 may be coupled to processor 402 by a bus 412. Accordingly, bus 412 may include multiple lines.

Processor 402 may be a central processing unit comprising one or more processor cores and may include any number of processors having any number of processor cores. The processor 402 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 406 may comprise one or more input devices connected to interface circuits for entering data and commands into the system 400. For example, the input devices may include a keyboard, mouse, touch screen, track pad, track ball, isopoint, a voice recognition system, and/or the like. Similarly, the I/O device 406 may comprise one or more output devices connected to the interface circuits for outputting information to an operator. For example, the output devices may include one or more displays, printers, speakers, and/or other output devices, if desired. For example, one of the output devices may be a display. Examples for a digital display may comprise any suitable visual interface for displaying content to a user of the wireless mobile device 102. In one embodiment, for example, a display may be implemented by a liquid crystal display (LCD) such as a touch-sensitive color (e.g., 16-bit or 32-bit color) thin-film transistor (TFT) LCD screen. In some embodiments, the touch-sensitive LCD may be used with a stylus and/or a handwriting recognizer program.

The system 400 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a removable secure execution module arranged to connect with a computing platform for a wireless mobile device, the removable secure execution module having a processing system to execute a security control module operative to communicate with a security server over a wireless channel on a periodic basis to obtain a security status for the wireless mobile device, and output control directives to control operations for one or more components of the computing platform based on the security status, the security control module comprising a security provisioning module operative to provision the computing platform with a security monitor module when the removable secure execution module is first connected to the computing platform, and bind the removable secure execution module to the computing platform and the security monitor module provisioned on the computing platform.

2. The apparatus of claim 1, the removable secure execution module comprising a smart card, a subscriber identity module card, a universal integrated circuit card, or a removable user identity module card.

3. The apparatus of claim 1, the removable secure execution module comprising a wireless service module arranged to control an international mobile subscriber identity for an operator of the wireless mobile device and an integrated circuit card identifier.

4. The apparatus of claim 1, the computing platform having a processing system to execute the security monitor module, the security monitor module operative to receive control directives from the security control module, and control operations for one or more components of the computing platform based on the control directives.

5. The apparatus of claim 1, the security control module comprising a security services module and a first security timer, the security services module operative to send a security timer update signal to the security server, determine whether a first security timer reset signal is received from the security server before the first security timer expires, and send a second security timer reset signal to a security agent for the security monitor module to reset a second security timer for the security monitor module when the first security timer reset signal is received before the first security timer expires.

6. The apparatus of claim 1, the security control module comprising a security services module and a security timer, the security services module operative to send a security timer update signal to the security server, determine whether a security timer reset signal is received from the security server before the security timer expires, and send a disable signal to a security agent for the security monitor module to disable operations for one or more components of the computing platform when the security timer reset signal is not received before the security timer expires.

7. The apparatus of claim 1, the security control module comprising a security services module and a security timer, the security services module operative to send a security timer update signal to the security server, determine whether a security timer reset signal is received from the security server before the security timer expires, and send an enable signal to a security agent for the security monitor module to enable previously disabled operations for one or more components of the computing platform when the security timer reset signal is received before the security timer expires.

8. The apparatus of claim 1, the security control module comprising a security services module operative to receive a first disable signal from the security server, and send a second disable signal to a security agent for the security monitor module to disable operations for one or more components of the computing platform.

9. The apparatus of claim 1, the security monitor module comprising a security agent and a security timer, the security agent operative to disable operations for one or more components of the computing platform when the security timer expires, when the security agent detects the removable secure execution module is disconnected from the computing platform, or when the security agent receives a disable signal from the security control module.

10. The apparatus of claim 1, the wireless mobile device comprising a digital display and a wireless transceiver.

11. A method, comprising:
receiving a security status from a security server by a security control module arranged for execution by a first processing system of a removable secure execution module when the removable secure execution module is connected to a computing platform;
sending control directives to a security monitor module arranged for execution by a second processing system of the computing platform, the control directives to control operations for one or more components of the computing platform based on the security status;
controlling operations for one or more components of the computing platform based on the control directives received from the security control module;
provisioning the computing platform with a security monitor module when the removable secure execution module is first connected to the computing platform; and binding the removable secure execution module to the computing platform and the security monitor module provisioned on the computing platform.

12. The method of claim 11, comprising disabling operations for one or more components of the computing platform when a security timer expires.

13. The method of claim 11, comprising disabling operations for one or more components of the computing platform when the removable secure execution module is disconnected from the computing platform.

14. The method of claim 11, comprising disabling operations for one or more components of the computing platform when the security monitor module receives a disable signal from the security control module.

15. The method of claim 11, comprising querying the removable secure execution module for a security state before starting an operating system for the computing platform.

16. An article comprising a non-transitory storage medium containing instructions that when executed by a processor enable a system to:
receive a first set of control directives from a security server by a security control module arranged for execution by a first processing system of a removable secure execution module when the removable secure execution module is connected to a computing platform;
send a second set of control directives to a security monitor module arranged for execution by a second processing system of the computing platform, the second set of control directives to control operations for one or more components of the computing platform;
provision the computing platform with the security monitor module when the removable secure execution module is first connected to the computing platform; and
bind the removable secure execution module to the computing platform and the security monitor module provisioned on the computing platform.

17. The article of claim 16, comprising instructions that when executed by a processor enable the system to disable operations for one or more components of the computing platform when a security timer expires, when the removable secure execution module is disconnected from the computing platform, or when the security monitor module receives a disable signal from the security control module.

* * * * *